United States Patent [19]

Ducousso et al.

[11] Patent Number: 5,295,253
[45] Date of Patent: Mar. 15, 1994

[54] CACHE MEMORY UTILIZING A TWO-PHASE SYNCHRONIZATION SIGNAL FOR CONTROLLING SATURATION CONDITIONS OF THE CACHE

[75] Inventors: Laurent Ducousso, Paris; Philippe Vallet, Lardy both of France

[73] Assignee: Bull S.A., Paris, France

[21] Appl. No.: 508,965

[22] Filed: Apr. 12, 1990

[30] Foreign Application Priority Data

Apr. 13, 1989 [FR] France .................. 89 04883

[51] Int. Cl.$^5$ .......................................... G06F 12/12
[52] U.S. Cl. .................................. 395/425; 395/400; 364/964; 364/964.2; 364/964.25; 364/964.34; 364/964.8; 364/971; 364/DIG. 2
[58] Field of Search ............... 395/400, 425; 364/DIG. 1, DIG. 2

[56] References Cited

U.S. PATENT DOCUMENTS

| | | | |
|---|---|---|---|
| 3,829,840 | 8/1974 | Burk et al. | 364/200 |
| 4,181,937 | 1/1980 | Hattori et al. | 364/200 |
| 4,453,230 | 6/1984 | Mizoguchi et al. | 364/900 |
| 4,489,378 | 12/1984 | Dixon et al. | 364/200 |
| 4,490,782 | 12/1984 | Dixon et al. | 364/200 |
| 4,571,674 | 2/1986 | Hartung | 364/200 |
| 4,589,092 | 5/1986 | Matick | 395/425 |
| 4,680,700 | 7/1987 | Hester et al. | 364/200 |
| 4,774,659 | 9/1988 | Smith et al. | 364/200 |
| 4,885,680 | 12/1989 | Anthony et al. | 395/425 |
| 4,970,643 | 11/1990 | Cramm | 395/400 |
| 4,980,816 | 12/1990 | Fukuzawa et al. | 395/400 |
| 5,008,813 | 4/1991 | Crane et al. | 364/200 |
| 5,109,496 | 4/1992 | Beausoleil et al. | 395/400 |
| 5,119,290 | 6/1992 | Loo et al. | 395/400 |
| 5,134,696 | 7/1992 | Brown et al. | 395/425 |

FOREIGN PATENT DOCUMENTS 62-131353  11/1987  Japan .

OTHER PUBLICATIONS

"Bringing Virtual Memory to Microsystems", J. Callahan et al, Electronics International, vol. 54, No. 13, pp. 119–122, Jun. 30, 1981, New York.
"Reference and Change Bit Recording", R. L. Hoffman et al., IBM Technical Disclosure Bulletin, vol. 23, No. 12, pp. 5516–5519, May 12, 1981, New York.
"Management Technique for Memory Hierarchies", C. M. May, IBM Technical Disclosure Bulletin, vol. 24, No. 1a, pp. 333–335, Jun. 1981, New York.
"Minicomputer Blasts Through 4 Million Instructions A Second", Electronics, Jan. 13, 1982, pp. 155–159, vol. 55 No. 1, W. P. Ward.
"A CMOS 32b Microprocessor with On-Chip Cache and Transmission Lookahead Buffer"; Session II:32b Microprocessors, Hiroshi Kadota, et al, IEEE International Solid-State Circuits Conference, 1987, pp. 36–37.

Primary Examiner—Thomas C. Lee
Assistant Examiner—Maria N. Von Buhr
Attorney, Agent, or Firm—Weingarten, Schurgin, Gagnebin & Hayes

[57] ABSTRACT

A device for fast memory access in a computer system that employs a high-speed associative memory for storing extracts that each include an address and an associated information element. Each extract is associated with a presence flip-flop and a reference flip-flop, their respective states being changed when an extract is used. The device according to the invention is designed to operate using two clock phases. During a first clock phase, the device compares an address to be translated with each address contained in the high-speed associative memory, evaluates a saturation condition, and latches the result of this evaluation. During the second clock phase, the device updates reference indicators as a function of the coincidence signals which are latched during the first phase and of the latched evaluation signal. The invention can be used in conjunction with cache memories and for translation of virtual addresses to real addresses.

17 Claims, 8 Drawing Sheets

CACHE MEMORY UTILIZING A TWO-PHASE SYNCHRONIZATION SIGNAL FOR CONTROLLING SATURATION CONDITIONS OF THE CACHE

FIELD OF THE INVENTION

The invention relates to computers and more particularly to facilitating access to information contained in a memory system of a computer.

BACKGROUND OF THE INVENTION

The central subsystem of a computer generally comprises three types of units: processors, memory modules forming the main memory, and input-output controllers. Usually the processors communicate with the memory modules through a bus that allows addressing and transfer of data between the processors and the main memory. To execute a program instruction, its operands must be located in the main memory. The same is true for successive instructions of the program to be executed. In the case of a multiprocessing system, the memory must be partitioned to allow multiplexing between programs. For this purpose, virtual addressing is generally used in conjunction with a pagination mechanism which includes dividing the addressable space, or "virtual space," into zones of a fixed size called "pages." In a system of this kind, a program being executed addresses a virtual space that corresponds to a real portion of the main memory. Thus, a logical or virtual address is associated with a physical or real address of the main memory.

An instruction that requires addressing contains information that enables the processor executing it to obtain a real address. In general, this virtual address is segmented, i.e., it is composed of a segment number, a page number, and a shift within the referenced page. The segment number in turn can be subdivided into a segment table number and a shift within this table.

In order to access an item of information in memory associated with this segmented address, several memory accesses are necessary. It is first necessary to access an address space table allocated to the process (program being executed) From this table, using a segment table number, the real address of the corresponding segment table is then obtained. Next, as a function of the shift in the segment table, a segment descriptor is accessed which makes it possible to calculate the real address of a page table. Eventually a real page address is found, using a function of the page number defining the shift within this page table, thereby making it possible to address the memory. The real address of a word or particular octet is obtained by concatenation of the real page address with the shift within this page defined by the least significant bits of the virtual address.

A memory access is relatively time consuming, due primarily to the use of a bus that is common to both the processors and the memory module. To improve system performance, the successive memory accesses typically required to obtain a real address are avoided as much as possible. Most processes have a locality property according to which, during a given phase of its execution, the number of pages used by a process is very small relative to the total number of pages allocated to that process.

The locality property can be used to facilitate the translation of a virtual address into a real address by the use of "extracts." Each extract includes a virtual address and an associated real address, and is used by the program during a single execution phase. A plurality of extracts are stored in high-speed memory or in the registers. To perform a translation of a virtual address into a real address, a high-speed associative memory is accessed to determine whether the virtual address to be translated is already present in the high-speed memory. If it is, the real address is obtained directly without accessing the main memory.

The locality property motivates the use of cache memories composed of small, high-speed memories in which the pages most recently referenced are permanently stored. The probability that a new reference will relate to an item of information already present in cache memory is high, so the effective access time is reduced. In a manner analogous to the translation of the virtual address into a real address, a cache memory comprises a table containing the real addresses of the pages present in the cache memory. This table, called a directory, can be consulted in an associative fashion to determine whether the information associated with a given real address is contained in the cache memory. If it is, a word or an octet is obtained by addressing the cache memory by means of the least significant bits of the virtual address of the word or octet.

Issues related to the translation of addresses will now be discussed, it being understood that the same considerations may apply to cache memories. In both cases, the issue is that of rapidly obtaining information associated with a page address. In the case of translation of an address, the page address is a virtual address and the associated information is the corresponding real address, while in the case of cache memory, the page address is a real address and the associated information is composed of all the data contained in the page.

As previously discussed, the high-speed translation memory is an associative memory. The memory comprising a given number of registers, or more generally, locations, each capable of storing one extract. Each extract can be accompanied by additional information such as right-of-access indicators or indicators reporting that a write access has been effected in the page associated with the extract. Moreover, each extract is associated with a presence indicator which, for a given logical value, indicates that the associated extract is valid. These presence indicators are, for example, set to zero at initialization, i.e., each time a process is activated in a particular processor. Thus, as the process uses new pages, the associated extracts are loaded into associative memory and the respective presence indicators are simultaneously set to 1. When a memory access must be executed, the virtual address is compared with the virtual address of each extract stored in associative memory. If there is a match between the virtual address being sought and one of the virtual addresses of an extract stored in the memory while its associated presence indicator is set to 1, the corresponding real address can be obtained directly by simply reading the register that contains the real address.

In order for this translation mechanism to be practical, the associative memory must be of limited size. Consequently, for processes with many pages, the associative memory can not store all the extracts corresponding to these pages. When associative memory is full, the only way to store a new extract therein is to erase an old extract. It is therefore necessary to provide a method for eradicating an old extract and storing a new extract in its place. To accomplish this, a replacement algorithm is used that decides which old extract is to be replaced by a new extract. Many algorithms have already been proposed, as for example:

the FIFO ("first in, first out") algorithm, in which the oldest algorithm is replaced;

the RAND ("random choice") algorithm, in which the extract to be replaced is chosen at random;

the LFU algorithm ("least frequently used"), in which the least frequently used extract is replaced; and the LRU ("least recently used") algorithm, in which the least recently used extract is replaced. The LRU algorithm theoretically gives good results, but in practice it is preferable to use a simplified version, called the "pseudo-LRU." To generate n extracts, a true LRU requires the presence and management of $\log_2(n)$ bits per extract to maintain an ordered history of the uses of the extracts. On the other hand, a pseudo-LRU requires only a single bit per extract, called a reference bit or an indicator bit.

According to the pseudo-LRU algorithm, the reference bit is set to a first logical value (1 for example) when its associated extract is used. When the associative memory is full, all the presence indicators are set to 1, and a new extract must be loaded. The extract to be replaced is the first extract encountered with a reference bit set to 0 according to the chronological order of filling. When saturation is reached, i.e., when all but one of the reference bits are set at 1, all the reference bits are reset to 0, and the extract whose reference bit is at 0 is replaced by the new extract. Resetting all the reference bits obliterates the history of the use of the extracts.

In view of the phenomenon of locality and the large number of memory accesses which occur during the execution of a program, the performance of a computer system depends in large measure on the speed with which its associative memory functions. It is therefore advantageous to optimize the associative read circuits, as well as the circuits that manage the presence and reference indicators, so that their updating does not slow down operation of the system.

SUMMARY OF THE INVENTION

The device according to the invention operates as follows: during a first clock phase, the virtual address to be translated is compared with each virtual address contained in high-speed memory, the saturation condition is evaluated, and the result of this evaluation is held as a latched evaluation signal; and during a second clock phase, the reference indicators are updated as a function of both a latched coincidence signal and the latched evaluation signal. Thus, the invention allows the clock to function in two phases, i.e., that allows execution of an associative read and a corresponding updating of the indicators during a cycle length corresponding to two clock phases, regardless of the logical state of the indicators.

More specifically, the invention is a device for facilitating access to information stored in the main memory of a computer system, the system being capable of accessing the information by addressing the main memory. The device comprises a high-speed memory including a plurality of locations, each location being capable of storing an extract. An "extract" is a real address in combination with an associated virtual address. Each stored extract is associated with a presence flip-flop and a reference flip-flop initially set to zero. The presence flip-flop associated with a location is forced to the logical value of 1 when an extract is loaded into the location. The high-speed memory is associated with comparison means that deliver, for each location, a coincidence signal that assumes a logic value of 1 when the virtual address of an information item sought matches the virtual address of the extract stored in that location. The device employs a two-phase synchronization signal. The coincidence signals are evaluated during a first phase and applied respectively to the input of a memorization means controlled by the first phase so as to form a latched coincidence signal according to the first phase. The device includes a common control circuit for generating, during the first phase, an evaluation signal as a function of the state of the reference flip-flops and the coincidence signals. The evaluation signal represents the state of saturation of the high-speed memory. The common control circuit includes means for storing the evaluation signal controlled by the first phase so as to generate a latched evaluation signal according to this phase. The device includes circuits for managing each of the active reference flip-flops during a second phase to control the flip-flops as a function of the latched evaluation signal and of the latched coincidence signals, respectively.

An implementation issue relates to the means for detecting the saturation condition of the reference flip-flops and for causing them to be reset to 0 within a single cycle of the two clock phases. Thus, according to a particular aspect of the invention, this condition is detected by an evaluation circuit which performs a complex logical function including the logical operation NOR applied to a plurality of logical terms, each term being the product of the complement of the reference bit and the complement of the coincidence signal associated respectively with each extract.

According to a further preferred embodiment of the invention (with the convention of positive logic), this evaluation circuit is made using CMOS technology and includes an evaluation line precharged during the second phase. Each location in the high-speed memory is associated with two NMOS transistors connected in series. The evaluation line is connected to ground through each of the transistors connected in series, and for each location, the gates of first and second transistors receive the complement of the reference indicator and the coincidence signal, respectively.

DESCRIPTION OF THE DRAWINGS

The invention will be more fully understood from the following detailed description, in conjunction with the accompanying drawings, in which.

DETAILED DESCRIPTION OF THE INVENTION

Figure 1:
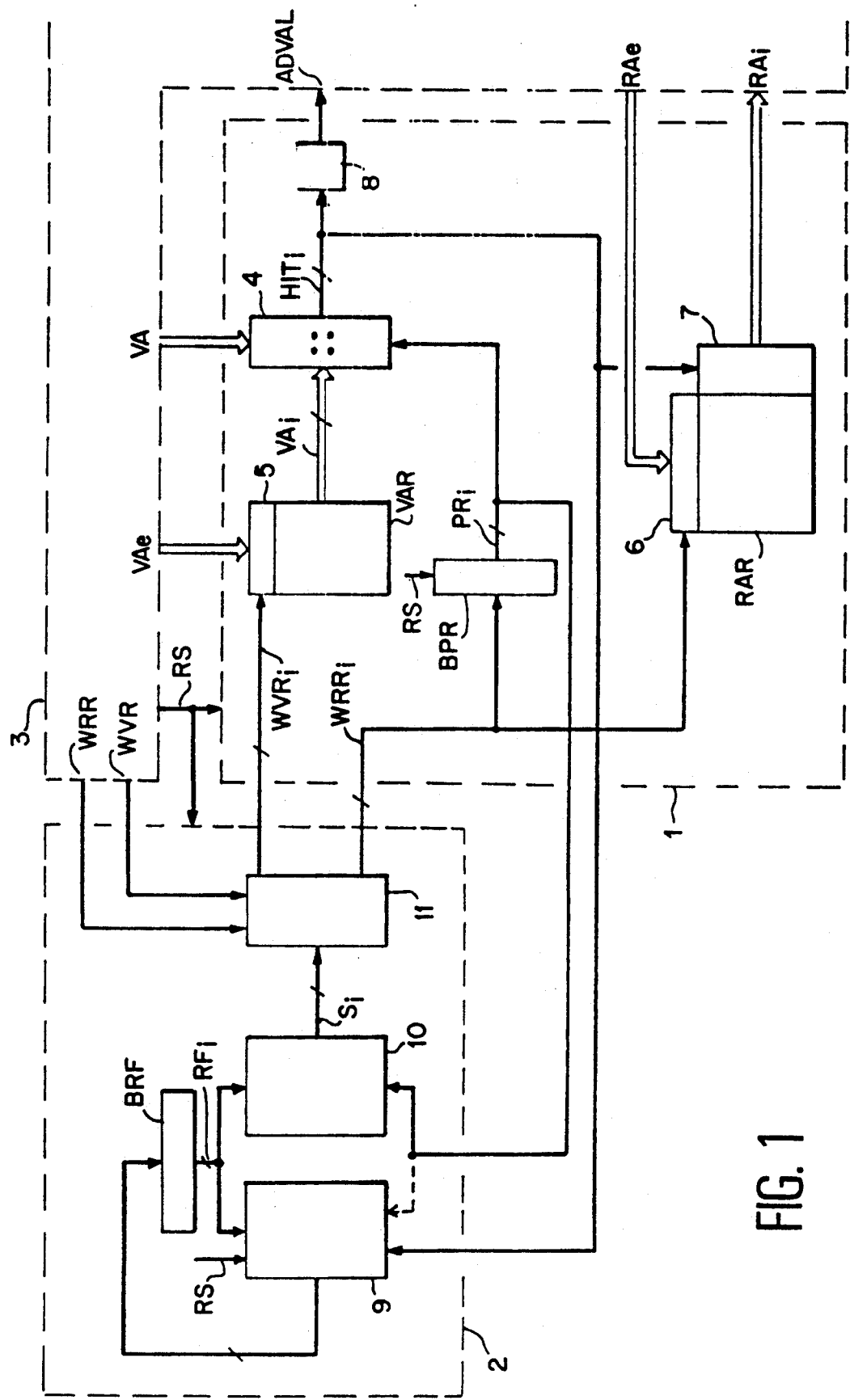
FIG. 1 is a block diagram of the processing means of a computer system that incorporates the invention.

With reference to FIG. 1, a high-speed associative memory 1 is connected so as to communicate with a controller 2 and with a portion of the circuitry 3 of a processor. In traditional fashion, the processor and its circuitry 3 is connected to the main memory (not shown). In particular, the circuitry 3 is a portion of the processor that relates to address translation, and includes an address development unit, generally microprogrammed for calculating the virtual addresses VA of the information sought. The microsoftware that controls the circuitry 3 executes searches in translation tables to obtain the real addresses as a function of the virtual addresses. This address translation is speeded up by the associative memory 1 that includes a number n of virtual address registers VAR and the same number of real address registers RAR. The associative memory 1 also has a set of n flip-flops BPR associated respectively with the virtual address registers and real address registers. The combination of a virtual address $VA_i$ contained in the virtual address register with rank i and a real address $RA_i$ contained in the real address register of the same rank, constitutes an extract i. This extract i is associated with a presence indicator $PR_i$ whose logical value corresponds to the state of the corresponding presence flip-flop. A comparator 4 is connected to outputs $VA_i$ of virtual address registers VAR and receives from the microsoftware of circuitry 3 the virtual address VA to be translated. Comparison circuit 4 is validated by output signals $PR_i$ from the presence flip-flops BPR. Circuit 4 provides coincidence signals $HIT_i$ whose logical values represent equality between the virtual address sought and one of the virtual addresses contained in registers VAR. The $HIT_i$ signals are provided to a validation circuit 8 that furnishes an address validation signal ADVAL to the microsoftware of circuitry 3, indicating whether address translation was successful.

In the event of a failure, the ADVAL signal initiates a microprogram that searches within the tables for the real address. Once a search has been done, the virtual address $VA_e$ and its associated real address $RA_e$ are applied respectively to input interfaces 5, 6 of the virtual and real address registers. The virtual and real addresses are then written in one of these registers under the control of write command signals $WVR_i$ and $WRR_i$, respectively. If translation is successful, coincidence signals $HIT_i$ authorize, via interface 7, reading of the real address register containing the translation sought.

Controller 2 comprises a set of reference flip-flops BRF associated respectively with the locations of memory 1, and with the extracts stored within those locations. The state $RF_i$ of the flip-flops BRF is determined by a control circuit 9 which receives coincidence signals $HIT_i$ and which is connected to the outputs $RF_i$ of the reference flip-flops BRF. A selection circuit 10 connected to the outputs of presence flip-flop BPR and the reference flip-flops BRF delivers selection signals $S_i$ which are applied to a load control circuit 11 that delivers the above-mentioned $WVR_i$ and $WRR_i$ signals. Selection signals $S_i$ determine the virtual and real address registers into which a new extract not present in the table must be loaded. The write commands $WVR_i$ and $WRR_i$ are determined by the load control circuit 11 as a function of the selection signals $S_i$ and common write command signals WRR, WVR that are delivered by the circuitry 3 under control of microsoftware. The microsoftware controlling the circuitry 3 also furnishes a signal RS that controls the resetting of the presence and reference flip-flops.

The device in FIG. 1 operates as follows. When a virtual address VA is to be translated, the microsoftware controlling the circuitry 3 places the virtual address at the input of the comparator 4. In the event of a match, the $HIT_i$ signals validate the real address register containing the translation sought and circuit 8 validates this address by the ADVAL signal. Control circuit 9 reupdates the state of the latter flip-flops as a function of the coincidence signals $HIT_i$, the number of extracts present in the high-speed memory, and the previous state $RF_i$ of the reference flip-flops. Selection circuit 10 reupdates selection signals $S_i$ according to the new state $RF_i$ of these flip-flops and the presence indicators $PR_i$, to determine which new registers will receive the next extract.

In the event of a translation failure, the ADVAL signal triggers the microprogram that searches in the tables. Once the search has been executed, the corresponding extract $VA_e$, $RA_e$ is presented to the inputs of interfaces 5, 6. Control circuit 11 then locates the extract according to the write signals WRR, WVR and selection signals $S_i$. Once the extract has been loaded into the selected registers, the microsoftware controlling the circuitry 3 makes a new attempt to translate the virtual address to be translated.

According to one feature of this embodiment, control circuit 9 takes into account the number of extracts present in the memory. As soon as this number is less than a given threshold value t, reference indicators $RF_i$ are kept unchanged and thus preserve the initial value (e.g., 0) which was imposed on them by the RS signal at the beginning of the process, for example, after a dispatch. As soon as the number of extracts present reaches or exceeds the value t, indicators $R_i$ can be modified according to the classical pseudo-LRU algorithm. It will be shown below how this threshold can be detected in practice.

The value of the threshold is determined by searching for the optimum value of the number n-t which corresponds to the number of extracts loaded between the time the threshold is reached and the time when the associative memory is full. To accomplish this, use can be made of statistical data relating to, in particular, the number of extracts used by the processes between two dispatches and the age of the reused pages. Another solution consists of making system operation simulations with characteristic programs, varying the value of the threshold.

As a non-limiting example, for a universal computer of the multiprocessor type with n=32, t may be chosen to equal 24.

Figure 2:
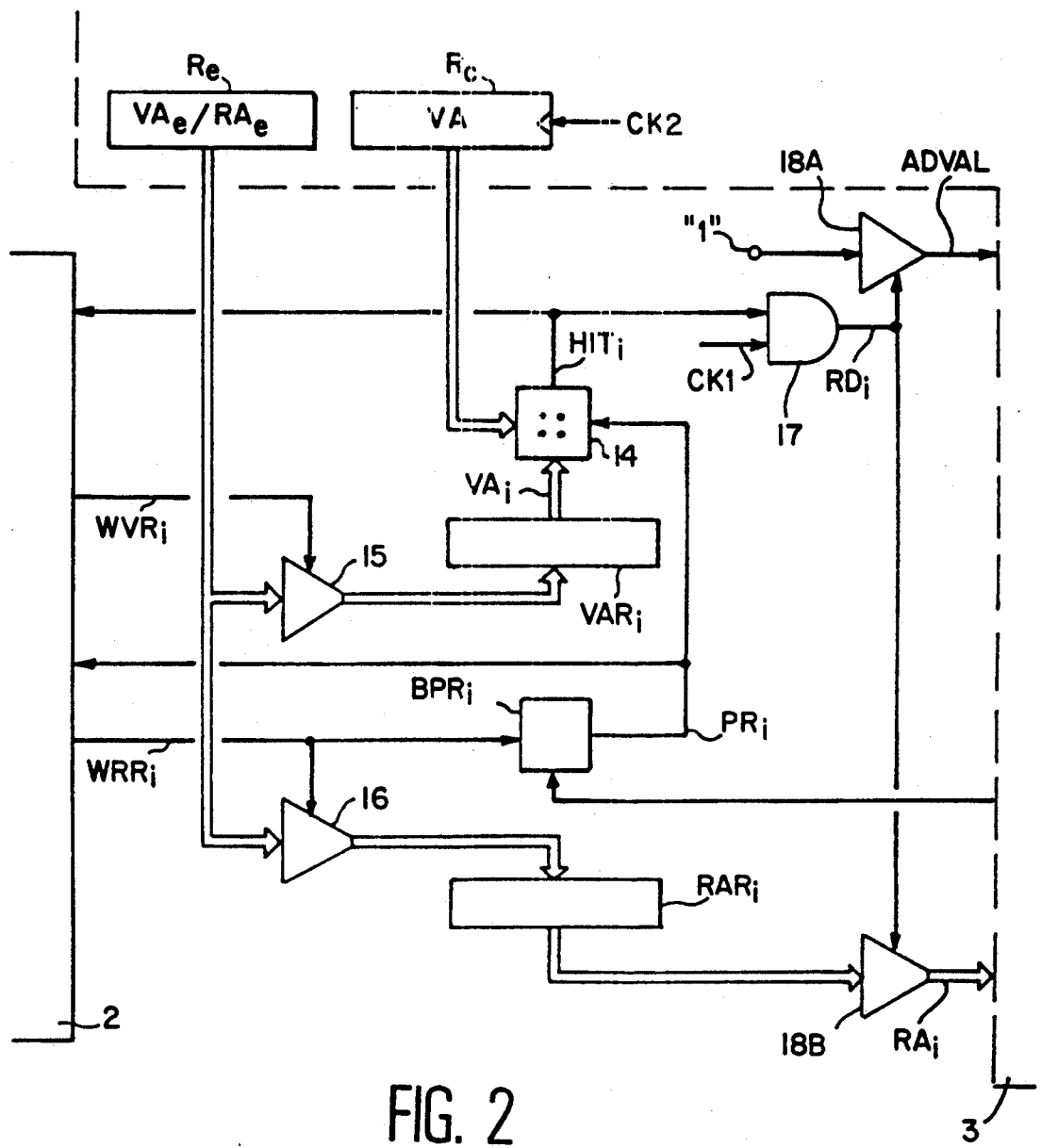
FIG. 2 is a schematic diagram of an embodiment of the high-speed associative memory.

FIG. 2 shows the part of memory 1 associated with one of the extracts. The virtual and real addresses of an extract i assumed to be loaded are contained in virtual address register $VAR_i$ and real address register $RAR_i$, respectively. The parallel output $VA_i$ of virtual address register $VAR_i$ is connected to a first input of a comparison circuit 14 of comparator 4 whose second input receives the virtual address to be translated VA that is furnished by register $R_c$. A presence flip-flop $BPR_i$ is connected at its output PR$_i$ to the validation input of circuit 14. Output PR$_i$ is also connected to controller 2. The output of circuit 14 is connected to the controller 2 to the input of a synchronization gate 17. Gate 17 is synchronized by the first phase CK1 of a clock signal.

The parallel output of real address register RAR$_i$ is connected to the input of an amplifier 18B validated by output signal RD$_i$ from synchronization gate 17. Signal RD$_i$ also validates amplifier 18A which receives at its input a voltage corresponding to logic value 1. The signals ADVAL and RA$_i$ from amplifiers 18A and 18B are sent to the microsoftware. controlling circuitry 3.

The virtual and real addresses VA$_e$ and RA$_e$ that are to be loaded into the registers are initially placed in an output register R$_e$ of the microsoftware. The parallel output of register R$_e$ is connected to the parallel inputs of registers VAR$_i$ and RAR$_i$ via amplifiers 15 and 16, respectively. Amplifiers 15 and 16 are validated respectively by signals WVR$_i$ and WRR$_i$ furnished by controller 2.

The circuit of FIG. 2 operates as follows. A clock (not shown) furnishes a clock signal with two phases CK1 and CK2. During phase CK2, the microsoftware of circuitry 3 places the virtual address to be translated VA in register R$_c$. During the next phase CK1, this address is compared in circuit 15 to the virtual address VA$_i$ contained in register VAR$_i$. If addresses VA and VA$_i$ are different, or if presence indicator PR$_i$ is at 0, coincidence signal HIT$_i$ will assume a value of 0. As a result, during phase CK1 amplifiers 18A and 18B are maintained in a state of high impedance.

If, on the other hand, addresses VA and VA$_i$ are identical while presence indicator PR$_i$ is at 1, coincidence signal HIT$_i$ assumes a value of 1. Thus, during phase CK1, real address RA$_i$ contained in register RAR$_i$ is transmitted to the microsoftware of circuitry 3 by means of amplifier 18B. Simultaneously, the ADVAL signal is at 1, thus indicating the success of translation. Note that amplifiers 18A associated with the various memory extracts execute a wired OR function that can advantageously be accomplished by means of a precharged line during phase CK2 and selectively unloaded by one of the signals RD$_i$ during phase CK1.

To load a new extract into the high-speed memory, the microsoftware of circuitry 3 first places the virtual address VA$_e$ of the extract in register R$_e$ and activates the virtual address write control signal WVR of FIG. 1. If register VAR$_i$ is selected, loading circuit 11 of controller 2 furnishes a WVR$_i$ signal which validates amplifier 15. Likewise, the corresponding real address RA$_e$ is then placed in output register R$_e$ and the WRR$_i$ signal validates amplifier 16.

Figure 3:
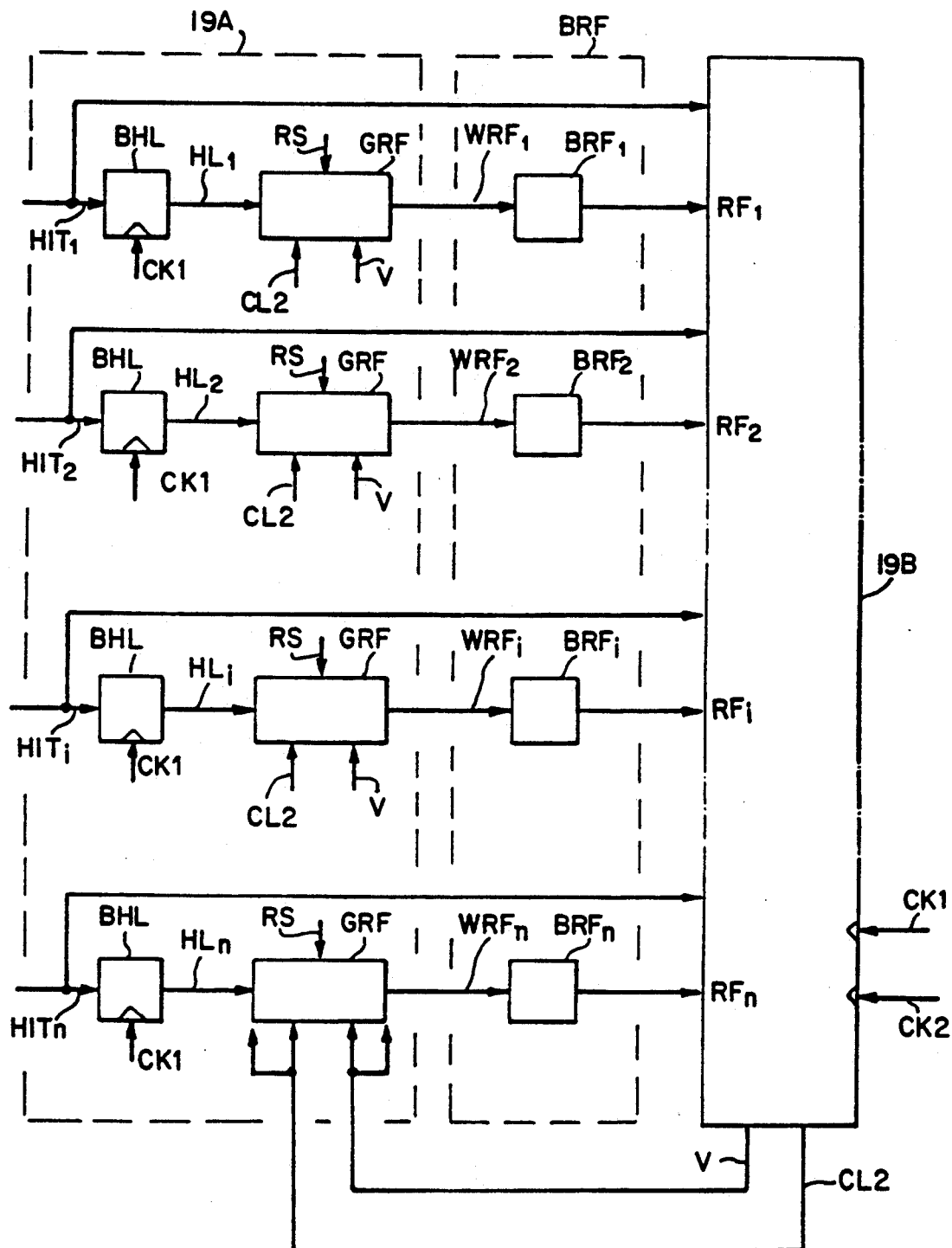
FIG. 3 is a schematic diagram of a control circuit of the reference indicators.

FIG. 3 shows reference flip-flops BRF and their control circuit 9 in greater detail. Control circuit 9 is composed of a common control circuit 19B and an assembly of flip-flop BRF management circuits 19A. With the locations (pairs of registers) of the associative memory being referenced by the subscripts 1, 2, ..., i, ..., n, they are associated respectively with flip-flops BRF$_1$, BRF$_2$, ..., BRF$_i$, ..., BRF$_n$. Each flip-flop BRF$_i$ is controlled by a signal WRF$_i$ furnished by an associated management circuit GRF. Outputs RF$_1$, RF$_2$, ..., RF$_i$, ..., RF$_n$ are connected to common control circuit 19B which furnishes to each management circuit GRF a prepositioning signal V for setting to 1 and a prepositioning signal CL2 for setting to 0. Circuit 19B also receives coincidence signals HIT$_1$, HIT$_2$, ..., HIT$_i$, ..., HIT$_n$. Each management circuit GRF receives a signal HL$_i$ which is the coincidence signal HIT$_i$ latched by a flip-flop BHL upon each phase CK1.

Figure 4:
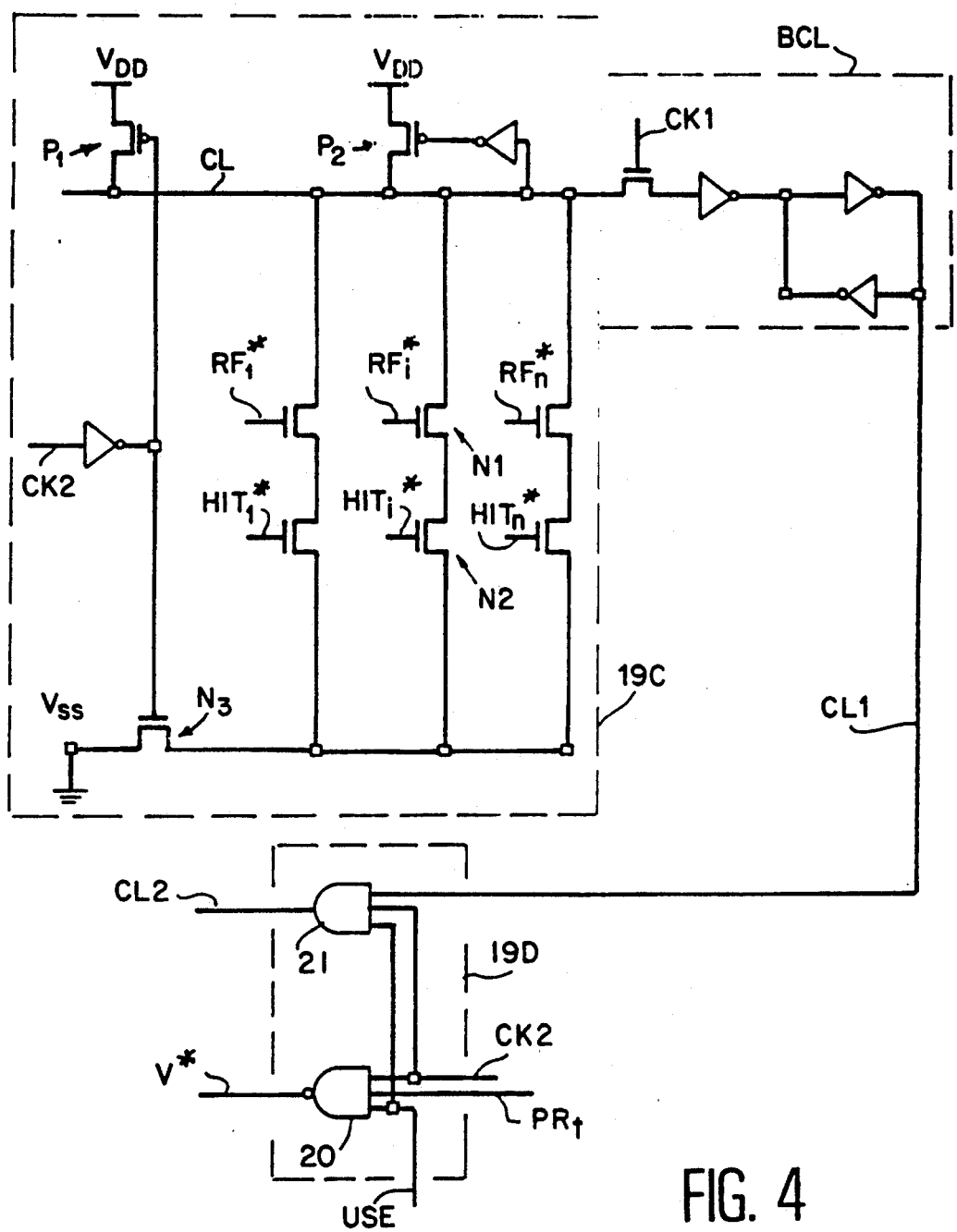
FIG. 4 is a schematic diagram of an implementation detail of the control circuit of FIG. 3.

The operation of the circuit in FIG. 3 will be explained with the reference to FIGS. 4 and 5 which represent detailed forms of common control circuit 19B and management circuit GRF, respectively. By convention, the explanations will be given in positive logic. Common control circuit 19B of FIG. 3 includes an evaluation circuit 19C, a flip-flop BCL, and a synchronization circuit 19D. Evaluation circuit 19C has an evaluation line CL whose state indicates whether the saturation condition of the high-speed memory has been reached. Circuit 19C consists of a complex logic gate in CMOS technology whose line CL is precharged during phase CK2 by means of PMOS transistors P1 and P2. Line CL is evaluated as a function of signals HIT$_i$* and RF*, respectively, which are the complements of the coincidence signals HIT$_i$ and the reference signal RF$_i$ associated with the extracts contained in the high-speed memory. The state of line CL is latched by the flip-flop BCL upon phase CK1. The flip-flop BCL then provides a latched evaluation signal CL1 at its output.

Line CL is connected to ground VSS via a common NMOS transistor N3 and, for each extract, via the series arrangement including two NMOS transistors N1 and N2 whose gates receive respectively the signals RF$_i$* and HIT$_i$* from the associated extract. This arrangement allows the following logic function (evaluated during phase CK1) to be implemented:

$$CL = +^* (RF_i^* . HIT_i^*)$$

where $+^*$ is the NOR function applied to the set of logical products RF$_i$*.HIT$_i$, for all values of i. Transistor N3, blocked during phase CK2, contributes to precharging of line CL.

Thus, from the beginning of operation of the associative memory, when all the indicators are initiatlized at 0, line CL is unloaded at each evaluation phase provided that the saturation condition is not reached. The saturation condition correspond to the case where all the reference indicators are at 1 except for the indicator that represents a coincidence event. If the saturation condition is reached, line CL retains logical value 1 during the evaluation phase, thereby reporting that the saturation condition is reached.

Synchronization circuit 19D includes an AND gate 21 with three inputs. A first input of the gate 21 receives the latched evaluation signal CL1, a second input receives phase CK2, and the third input receives an authorization-to-operate signal USE. The signal USE is a command signal furnished by the microsoftware of the circuitry 3.

Circuit 19D also has a NAND gate 20 with three inputs receiving, respectively, clock signal CK2, the command signal USE, and a threshold signal PR$_t$ which assumes logic value 1 when the high-speed memory loading threshold is reached. Gate 20 generates a signal V* which is the complement of the prepositioning signal V that sets to 1. Provided the locations are loaded in a given order, the threshold signal can be obtained simply by reading flip-flop BPR$_t$ whose rank is equal to the value of threshold t and that which was chosen.

Figure 5:
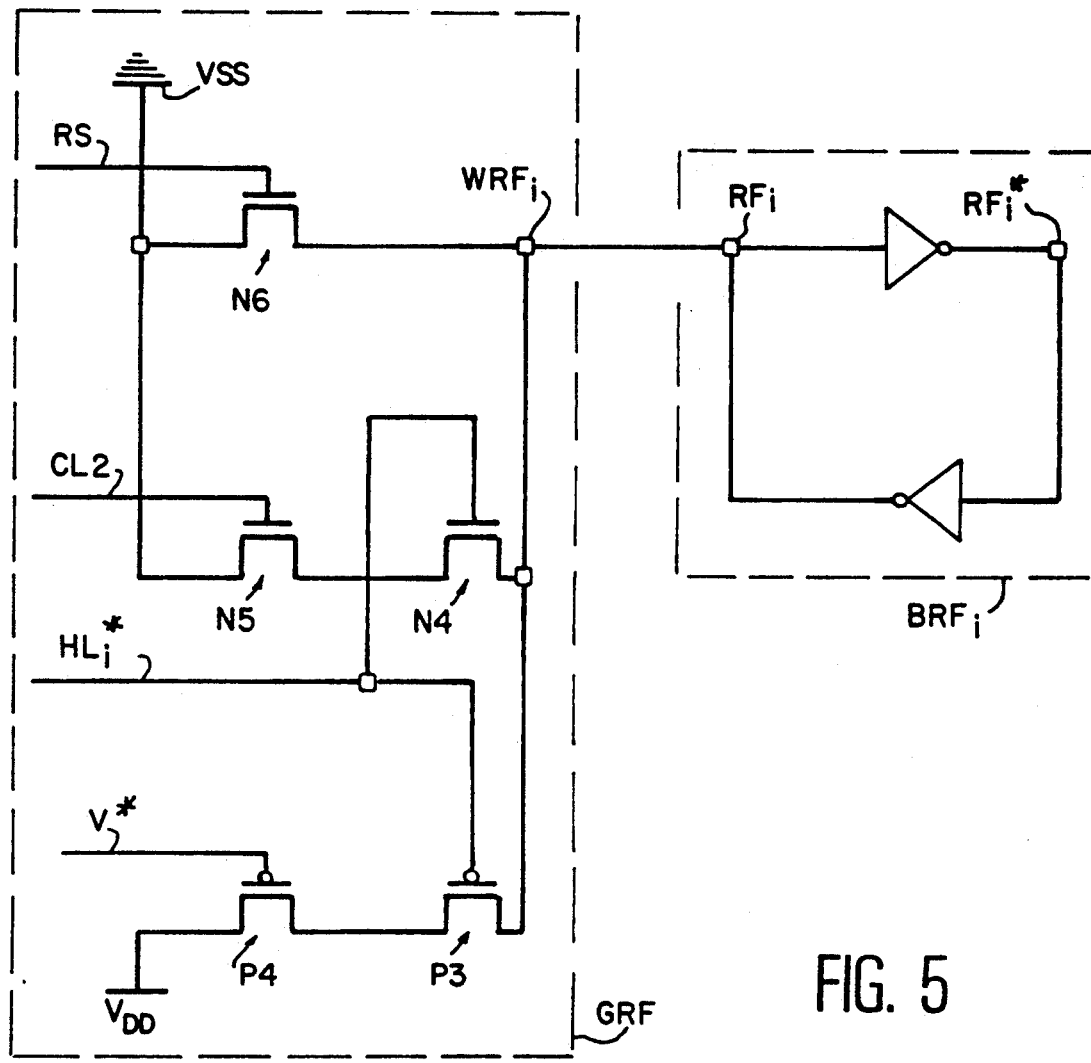
FIG. 5 is a schematic diagram of a management circuit of one of the reference flip-flops.

FIG. 5 represents reference flip-flop BRF$_1$ and its associated management circuit GRF. Flip-flop BRF$_1$ is composed simply of two inverters mounted head-to-tail which furnish reference indicator RF$_1$ and its complement RF$_1$*. The state RF$_1$ of flip-flop BRF$_i$ is controlled by line WRF$_i$. Line WRF$_i$ can be unloaded via the series arrangement formed of two NMOS transistors N4, N5 or via an NMOS transistor N6. Transistors N4, N5 and N5 receive at their respective gates the HL$_i$* signal which is the complement of the HL$_i$ signal, the CL2 signal, and the RS signal. As a result, line WRF$_i$ is unloaded when the RS signal is at 1 or when the CL2 signal is at 1 while the HL$_i$ signal is at 0. Thus, flip-flop BRF$_i$ is forced to 0 when the saturation condition is detected while the virtual address contained in the associated register does not match the virtual address to be translated.

Line WRF$_i$ may be placed at logical value 1 via the series arrangement formed of two PMOS transistors P3, P4 that receive the signals HL$_i$* and V* at their respective gates. As a result of this arrangement, flip-flop BRF$_i$ is forced to 1 when signals V and HL$_i$ are at 1, i.e., when the virtual address sought matches the virtual address contained in the register, provided that the threshold is reached.

Figure 6:
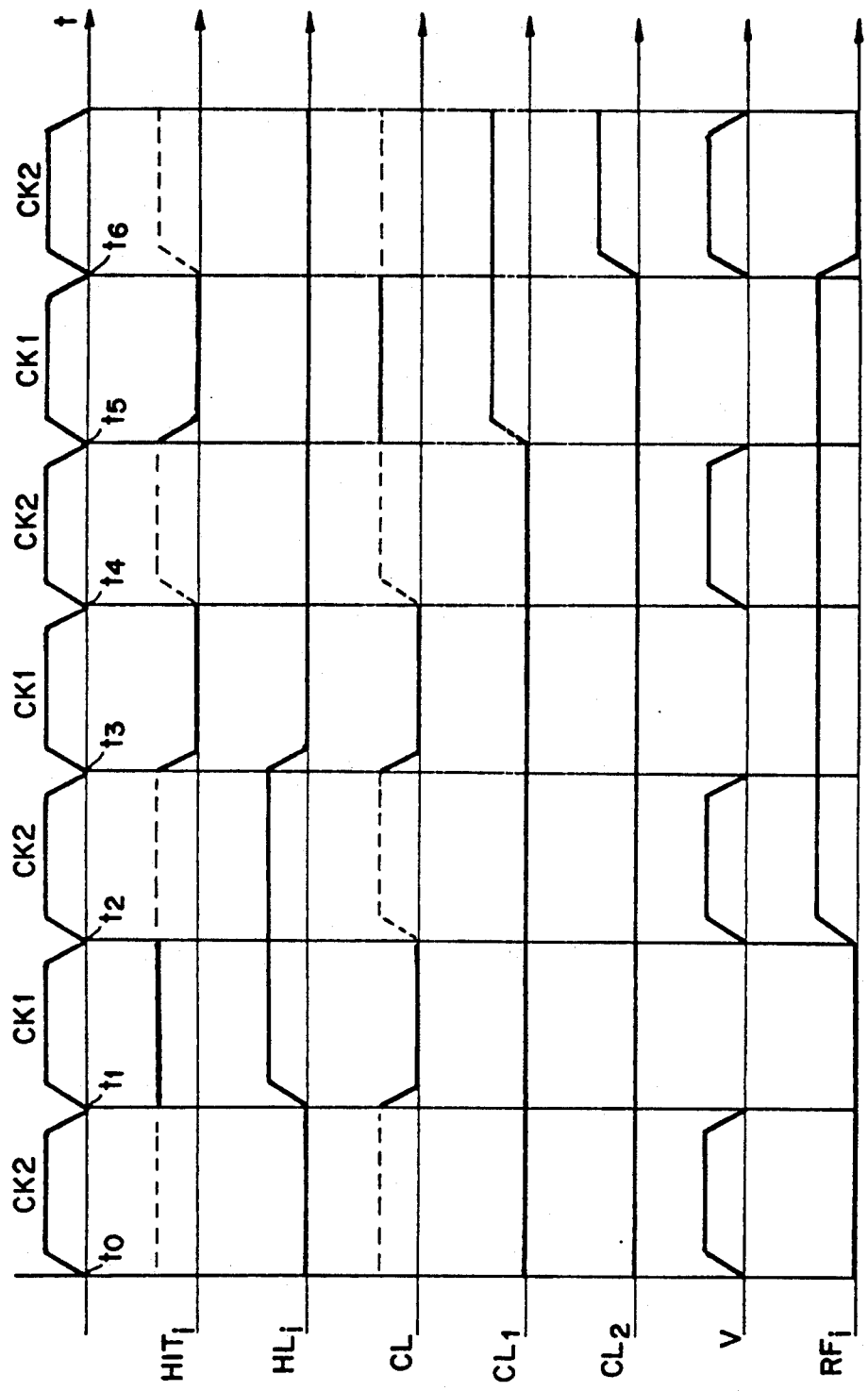
FIG. 6 is a timing diagram illustrating the operation of the circuits shown in FIGS. 3, 4 and 5.

The full operation of the circuits of FIGS. 3, 4 and 5 will now be explained in relation to the timing diagram of FIG. 6. This diagram represents the changes in state over time of the signals CL, CL1, CL2, and V generated by the common control circuit 19B of FIGS. 3 and 4, as well as the signals HIT$_i$, HL$_i$, and RF$_i$ associated with extract i of the associative memory 1 of FIG. 3. It is assumed that extract i is present, i.e., indicator PR$_i$ is at 1. It is also assumed that the threshold has already been reached, i.e., the signal V is at 1 during phase CK2, hence the signal V* is at 0 during this phase. Finally, it is assumed that at initial time t$_0$, the reference indicator RF$_i$ and the latched evaluation signal CL1 are both at 0.

Precharging of line CL of circuit 19C starts at time t$_0$ during phase CK2. Starting at time t$_1$, during the following phase CK1, coincidence signal HIT$_i$, assumed to have value 1, is evaluated. During this phase, signal HIT$_i$, is held by flip-flop BHL whose state HL$_i$ goes to 1. At the same time, line CL is evaluated. Assuming that saturation is not reached, signal CL goes to 0 and signals CL1 and CL2 also remain at 0. During the next phase CK2, starting at time t$_2$, line CL is once more precharged. Also, with coincidence signal HL$_i$ and validation signal V at 1, transistors P3 and P4 of management circuit GRF conduct, and line WRF$_i$ is charged to a positive voltage, thus forcing indicator RF$_i$ to 1.

During the next phase CK1 after time t$_3$, assuming that there is no match, coincidence signal HIT$_i$ goes to 0 thus forcing signal HL$_i$ to 0. Still assuming that the saturation condition is not reached, line CL is set to 0 during this phase and signals CL1 and CL2 remain at 0. As a result, during the next phase CK2 after time t$_4$, signal CL2 at 0 keeps transistor N5 in a blocked state, thus preventing flip-flop BRF$_i$ from being reset to 0.

During the next phase CK1, after time t$_5$, we have assumed that the threshold condition was reached and signal HIT$_i$ was at 0. As a result, line CL remains high, thereby setting the state CL1 of flip-flop BCL to 1. Thus, during the next phase CK2 after time t$_6$, the prepositioning zero-resetting signal CL2 goes to 1, making transistor N5 conduct. Since signal HL$_i$ is at 0, transistor N4 also conducts and line WRF$_i$ is unloaded and indicator RF$_i$ is reset to 0. The above description shows that the associative memory always operates in accordance with two clock phases, even when the reference indicators must be reset to 0.

Figure 7:
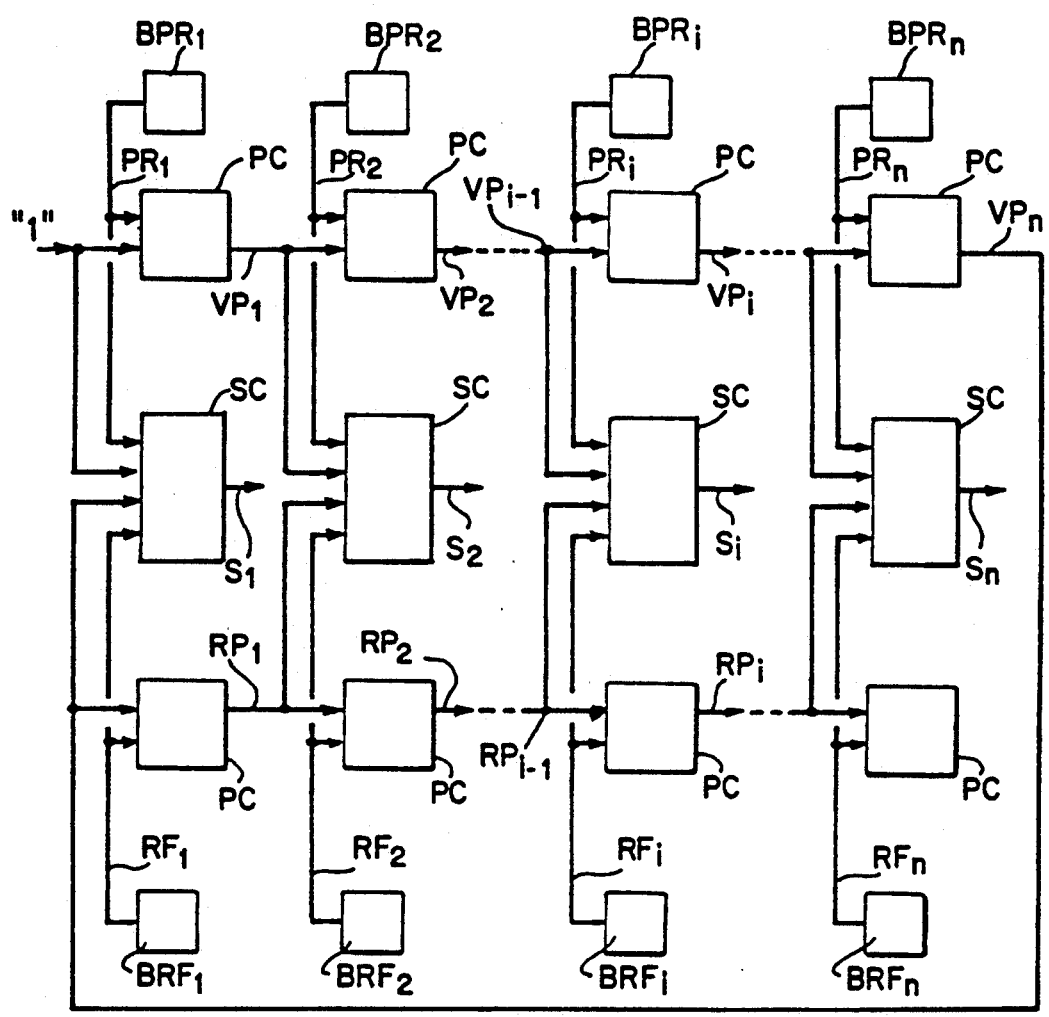
FIG. 7 is a block diagram of a selection circuit for determining the location of the high-speed associative memory into which a new extract is to be loaded.

FIG. 7 represents selection circuit 10 of FIG. 1. We find presence flip-flops BPR$_1$, BPR$_2$, ..., BPR$_i$, ..., BPP$_n$, and reference flip-flops BRF1$_1$, BRF$_2$, ..., BRF$_i$, .., BRF$_n$, associated respectively with extracts of rank 1, 2, ..., i, ..., n from the associative memory. Each extract i has associated with it a selection cell SC and two propagation circuits PC that propagate a request signal, associated respectively with extract presence and reference flip-flops. Each propagation circuit PC furnishes a request signal VP$_i$ or RP$_i$, and receives indicator PR$_i$ or RF$_i$, of the associated flip-flop, as well as request signal VP$_{i-1}$ or RP$_{i-1}$ from the upstream propagation circuit.

Output VP$_n$ of propagation circuit PC associated with presence flip-flop BPR$_n$ of the last extract of rank n is applied to the request input of the propagation circuit associated with reference flip-flop BRF$_i$ of the first extract. In addition, the request input of propagation circuit PC associated with presence flip-flop BPR$_1$ of the first extract continuously receives a signal representing the existence of a request. In the example shown, we assumed that a request was present when the associated request signal was at 1. Alternatively, the reverse convention could be chosen without thereby departing from the framework of the invention.

Each propagation circuit is designed to deliver a request signal VP$_i$, or RP$_i$, that represents the existence of a request when the upstream request signal VP$_{i-1}$ or RP$_{i-1}$ indicates the existence of a request while indicator PR$_i$ or RF$_i$ is at 1. Moreover, selection cell SC furnishes a selection signal S$_i$ representing the selection of an extract i when one of the upstream request signals VP$_{i-1}$ or RP$_{i-1}$ reports the existence of a request when associated the flip-flop BPR$_i$ or BRF$_i$ is at 0.

The circuit in FIG. 7 operates as follows. As a function of the state of the presence and reference flip-flops, the request signal permanently applied to the input of the propagation circuit associated with first presence flip-flop BPR$_i$ propagates stepwise, in increasing extract order, via propagation circuits associated first with the presence flip-flops, then via propagation circuits associated with the reference flip-flops. Propagation of the request signal stops at the propagation circuit that is associated with a presence flip-flop or reference flip-flop which is at 0. The selection cell associated with this extract then places selection signal S$_i$ at a specific logical value, indicating that a new extract must be written in the associated registers.

Thus, the circuit of FIG. 7 always allows the location of the associative memory that is to receive a new extract to be pinpointed. The loading algorithm employed by this circuit thus consists of searching, in ascending order according to the ranks assigned to the locations, the first location containing no extract (the first whose presence indicator PR$_i$ is set at 0), then the second extract which has not been used recently (the first whose reference indicator RF$_i$ is set at 0). According to this arrangement, updating of selection signals S$_i$ is automatically controlled by the change in state of the presence and reference flip-flops.

Due to the cascade arrangement of a propagation circuit, its reaction time is fairly long. Fortunately, the selection signals are not utilized until after the search in the tables for a new extract to be loaded, which is also a fairly lengthy operation. However, the slowness of the selection circuit may become cumbersome if the associative memory has a large number of extracts. Thus, to overcome this slowness, and according to one advantageous embodiment of the invention, optimization of the selection cells and propagation circuits is employed to reduce the number of layers of these circuits, thereby increasing operating speed. Accordingly, two different types of cells are provided, each type respectively associated with either odd or even rank locations.

Figure 8:
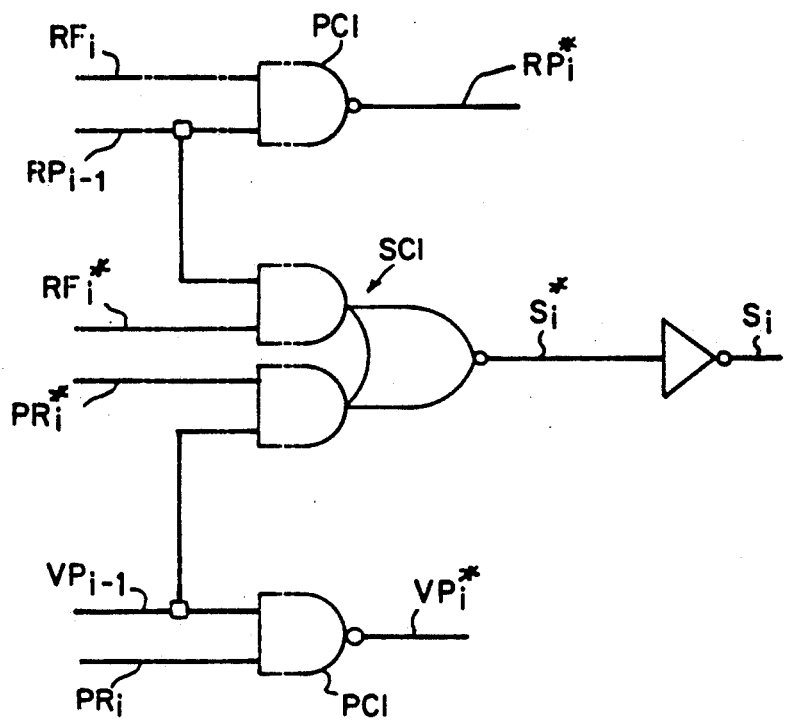
FIGS. 8 and 9 are schematic diagrams of the implementation details of the circuit of FIG. 7.

FIG. 8 shows selection cell SCI and propagation circuits PCI associated with an odd-ranked location. Propagation circuits PCI each consist of a NAND gate receiving, at a first input, associated indicator $RF_i$, $PR_i$ and at a second input, upstream request signal $RP_{i-1}$, $VP_{i-1}$. The PCI gates deliver at their outputs the request signal complements $RP_i^*$, $VP_i^*$. The SCI cell is a complex logic gate which receives at the input the upstream request signals $RP_{i-1}$, $VP_{i-1}$ and complements $RF_i^*$, $PR_i^*$ of indicators $RF_i$, $PR_i$ The SCI gate implements the equation:

$$S_i^* = (RF_i^* \cdot RP_{i-1} + PR_i^* \cdot VP_{i-1})^*$$

To obtain signal $S_i$, the output $S_i^*$ of the SCI gate is connected to an inverter.

Figure 9:
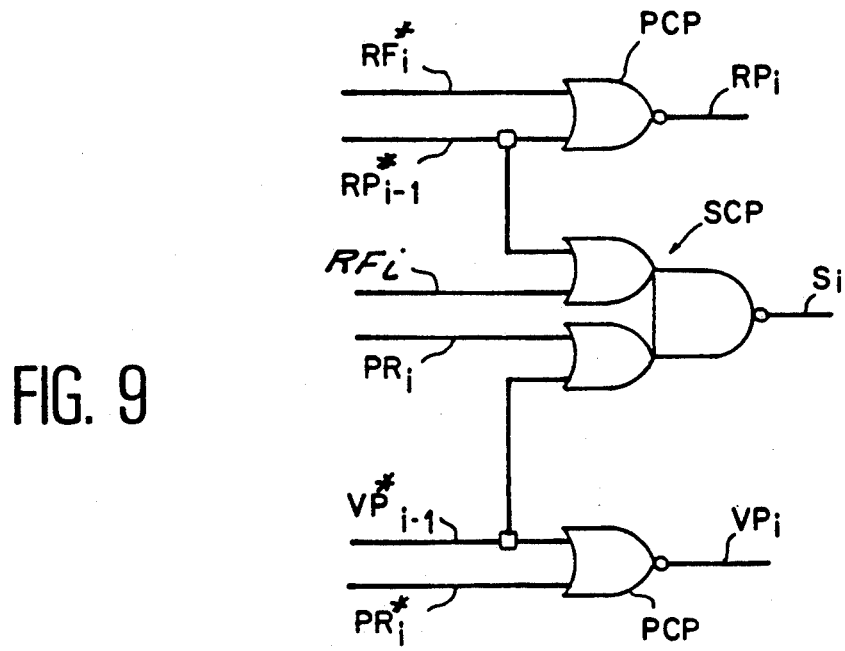

FIG. 9 shows a selection cell SCP and propagation circuits PCP associated with an even-ranked location. The propagation cells PCP are implemented by NOR gates that receive, at a first input, the complement of associated indicator $RF_i$, $PR_i$ and at a second input, the complement $RP_{i-1}^*$, $VP_{i-1}^*$ of request signal $RP_{i-1}$, $VP_{i-1}$ coming from the preceding odd stage. Selection cell SCP is a complex gate receiving at its input indicators $RF_i$, $PR_i$ and complements of associated request signals $RP_{i-1}$, $VP_{i-1}$. The SCP gate delivers selection signal $S_i$ verifying the preceding logical equation. Cells SCI, SCP, and gates SCI, PCP can easily implemented in CMOS technology.

Figure 10:
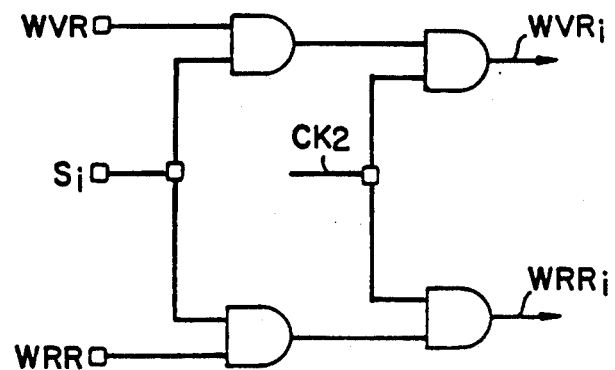
FIG. 10 is a schematic diagram of a control circuit for loading one of the locations of the high-speed associative memory.

Finally, FIG. 10 represents the circuit for generating write command signals $WVR_i$ and $WRR_i$ associated with registers $VAR_i$ and $RAR_i$ respectively as a function of control signals WVR, WRR and selection signal $S_i$. The circuit in FIG. 10 is made with AND logic gates allowing transmission of common signals for controlling the writing of virtual address WVR or real address WRR, validated by selection signal $S_i$ and synchronized by clock phase CK2.

Other modifications and implementations will occur to those skilled in the art without departing from the spirit and the scope of the invention as claimed. Accordingly, the above description is not intended to limit the invention except as indicated in the following claims.

What is claimed is:

1. A device for accessing information stored in a main memory of a computer system, said device comprising:

an associative memory having a plurality of memory locations, each of said memory locations for storing an extract, wherein said associative memory includes a like plurality of presence flip-flops each of said memory locations coupled to a corresponding one of said plurality of presence flip-flops;

a plurality of reference flip-flops, each of said presence flip-flops and said reference flip-flops being initially set to logic value 0, wherein a particular one of said plurality of presence flip-flops is set to logic value 1 in response to an extract being stored in a particular one of said plurality of memory locations;

wherein said associative memory includes a comparison circuit for comparing a virtual address of an information item sought to a virtual address of the extract stored in said particular memory location and for providing for each memory location, a coincidence signal having a logic value 1 in response to a virtual address of an information item sought matching a virtual address of the extract stored in said particular memory location and wherein access to information in the main memory is accelerated by accessing information from the associative memory in the case of a match and wherein in the case of no match, information is accessed from the main memory and duplicated into the associative memory as an information portion of an extract; and wherein the device is adapted to receive a two-phase synchronization signal and each of said coincidence signals is evaluated during a first phase of said two-phase synchronization signal;

a plurality of latching flip-flops, coupled to said associative memory, each of said latching flip-flops for receiving a corresponding coincidence signal from said comparison circuit, wherein said latching flip-flops are responsive to the first phase of said two-phase synchronization signal and wherein each of said latching flip-flops provides a latched coincidence signal in response to the first phase of the synchronization signal;

a plurality of management circuits, each of said management circuits coupled to a corresponding one of said latching flip-flops, each of said management circuits for receiving said latched coincidence signal from the corresponding latching flip-flop and for providing a control signal to a corresponding one of said reference flips-flops;

a common control circuit coupled to said reference flip-flops, said common control circuit for receiving a reference indicator signal from each of said reference flip-flops, for receiving each coincidence signal from said comparison circuit and for generating, during the first phase of said two-phase synchronization signal, an evaluation signal having a value determined by a logic state of said reference flip-flops and said coincidence signals, said evaluation signal having a first value when said associative memory is in a saturation state and having a second different value when said associative memory is not in a saturation state and wherein the evaluation signal indicates a saturation state in response to the following conditions being concurrently met;

(a) each of the reference flip-flops but a last reference flips-flop have a logic value of 1; and (b) a coincidence signal corresponding to the last reference flip-flop and having a logic value of 0 is about to be set to 1;

and wherein when such conditions are detected during the first phase of the two-phase synchronization signal, each of the reference flip-flops except for the last reference flip-flop are reset to 0 and during the second phase of the two-phase synchronization signal the last reference flip-flop is set to 1 and wherein said common control circuit comprises:

an evaluation circuit including an evaluation line wherein a state of said evaluation line is defined during the first phase of the two-phase synchronization signal and wherein said evaluation line is precharged during the second phase of said two-phase synchronization signal; and a second latching flip-flop for storing, said evaluation signal, wherein said second latching flip-flop is responsive to the first phase of said two-phase synchronization signal and wherein said second latching flip-flop provides a latched evaluation signal during the first phase of said two-phase synchronization signal.

2. The device of claim 1 wherein said evaluation circuit performs a NOR logic operation upon a set of logical terms, wherein each of said logical terms represents a particular extract, and each of said logical terms corresponds to a logical product between a first signal having a value corresponding to a complement of a reference indicator signal and a second signal having a value corresponding to a the complement of the coincidence signal corresponding to said extract.

3. The device of claim 2 wherein said evaluation line is provided as a prechargeable evaluation line, wherein said precharged evluation line is prechargeable during the second phase of said two-phase synchronization signal, wherein said evaluation line is provided having a reference voltage coupled thereto, wherein the reference voltage is provided having a first predetermined value in response to the associative memory being in a saturation state;

a plurality of pairs of serially connected transistors, with a first electrode of a first transistor of each transistor pair coupled to said evaluation line and a first electrode of a second transistor of each transistor pair coupled to a first reference potential; and wherein, for each transistor pair, a signal having a value which is the complement of the value of said reference indicator signal is fed to a second electrode of the first transistor of said transistor pair, and a signal having a value which is the complement of the value of said coincidence signal corresponding to said extract is fed to a second electrode of the second transistor of said transistor pair.

4. The device of claims 2 or 3, wherein said common control circuit comprises:

a synchronization circuit, coupled to said evaluation circuit, said synchronization circuit for providing to a reference flip-flop management assembly a prepositioning signal for placing said reference flip-flop management assembly in a reset state, wherein said synchronization circuit is active during the second phase of said two-phase synchronization signal and said synchronization circuit provides an output signal having the same logical value as said latched evaluation signal; and wherein the reference flip-flop management assembly includes a plurality of reference management circuits wherein each of the reference management circuits is coupled to a corresponding one of the reference flip-flops and wherein each of the reference management circuits resets the corresponding reference flip-flop to a logical value of 0 when said prepositioning signal is provided having a logical value of 1 and a corresponding latched coincidence signal is provided having a logic value of 0.

5. The device of claim 4, wherein each of said reference management circuits includes an output line coupled to a first reference potential through a pair of serially connected transistors, each of said serially connected transistors receiving on a respective gate electrode thereof a respective one of the prepositioning signal and a signal having a value which is complementary to the value of the latched coincidence signal corresponding to said memory location; and wherein said output line is coupled to a positive voltage source through a second pair of serially connected transistors, each transistor of said second pair of serially connected transistors receiving on a respective gate electrode thereof, a signal having a value which a complementary to the value of a validation signal and the complement of the corresponding latched coincidence signal.

6. The device of claim 1 wherein a new extract is written into said associative memory during the second phase of said two-phase synchronization signal.

7. The device of claim 1, wherein said comparison circuit is a first one of a plurality of comparison circuits each of said plurality of comparison circuits response to a corresponding one of said plurality of memory locations and each of said plurality of comparison circuits validated by a state signal of the corresponding presence flip-flop coupled thereto, such that each of the comparison circuits emits a coincidence signal when said corresponding presence flip-flop provides a state signal in logic state 1.

8. The device of claim 1 wherein:

an address of each extract is a virtual page address and a corresponding information element is a real address of a virtual page of the computer system;

each memory location in said associative memory includes a register of virtual addresses and a register of real addresses; and a reading of said register of real addresses is validated during the first phase of said two-phase synchronization signal in response to meeting a condition that the corresponding coincidence signal has a logic value of 1.

9. A device for accessing information stored in a main memory of a computer system, wherein said device is coupled to the main memory through an address translation processor wherein the address translation processor includes an address development unit for calculating a virtual address of information sought, said device comprising:

(a) an associative memory having a plurality of memory locations, each of said memory locations for storing an extract, said associative memory comprising:

(i) a plurality of virtual address registers;

(ii) a comparison circuit, coupled to said plurality of virtual address registers and coupled to the address translation processor, said comparison circuit for receiving a virtual address to be translated from the address translation processor and for comparing the received virtual address with virtual addresses in the plurality of virtual address registers and for providing a plurality of coincidence signals, each of said coincidence signals having a first logic value in response to a virtual address of an information item sought matching one of the virtual addresses stored in the plurality of virtual address registers;

(iii) a plurality of presence flip-flops coupled to said comparison circuit, each of said presence flip-flops for receiving a real address write command signal and for providing a presence indicator output signal to said comparison circuit, wherein the presence indicator output signal has a logic value indicative of a state of the corresponding presence flip-flop; and (b) a controller, coupled to said associative memory and to the address translation processor, for receiving the coincidence signals and the presence indicator signals from said associative memory and for providing the real address write command signal to the presence flip-flops of said associative memory wherein said controller comprises:
(i) a plurality of reference flip-flops, wherein each of said reference flip-flops are coupled to said associative memory, and wherein each of said presence flip-flops and reference flip-flops are initially set to a logic value 0, and a first one of the plurality of presence flip-flops is set to a logic value 1 in response to an extract being stored in a corresponding one of said plurality of memory locations; and
(ii) a control circuit, coupled to said reference flip-flops, said control circuit for receiving each of said coincidence signals from said comparison circuit, for receiving a reference indicator signal from said reference flip-flops and for updating a logic state of the reference flip-flops in response to the values of the coincidence signals and the reference indicator signals and wherein said control circuit further provides an evaluation signal during a first phase of a two-phase synchronization signal, wherein the evaluation signal has a value determined by a logic state of said reference flip-flops and said coincidence signals, said evaluation signal having a first value when said associative memory is in a saturation state and having a second different value when said associative memory is not in a saturation state and wherein the evaluation signal indicates a saturation state in response to the following conditions being concurrently met;
(a) each of the reference flip-flops but a last reference flip-flop have a logic value of 1; and
(b) a coincidence signal corresponding to the last reference flip-flop and having a logic value of 0 is about to be set to 1;

and wherein when such conditions are detected during the first phase of the two-phase synchronization signal, each of the reference flip-flops except for the last reference flip-flop are reset to 0 and during the second phase of the two-phase synchronization signal the last reference flip-flop is set to 1.

10. The device of claim 9 wherein:
said associative memory further comprises:
(iv) a validation circuit having an input port coupled to an output port of said comparison circuit and having an output port coupled to the address translation processor, said validation circuit for receiving the coincidence signals from said comparison circuit and for providing an address validation signal to the address translation processor, wherein the address validation signal has a value indicative of whether address translation was successful; and
(v) a plurality of real address registers coupled to said control circuit and to the address translation processor, wherein in response to a successful address translation, each of said coincidence signals are provided having values which allow the address translation processor to read a corresponding one of the plurality of real address registers containing the translation sought and in response to a failed address translation, the address validation signal fed to the address translation processor initiates a real address search, within a translation table, for a real address corresponding to the virtual address.

11. The device of claim 10 wherein:
upon completion of the real address search, the virtual address and the corresponding real address are provided to respective ones of the virtual address register and the real address register;
the virtual address is written into the virtual address register in response to a virtual address write command signal fed to said virtual address register from said control circuit; and
the real address is written into the real address register in response to a real address write command signal fed to said real address register from said control circuit.

12. The device of claim 11 wherein said control circuit comprises:
a reference flip-flop management circuit, coupled to said reference flip-flops, for receiving the coincidence signals from said comparison circuit and for providing a control signal to said reference flip-flops;
a command control circuit, coupled to said reference flip-flop management circuit, and said reference flip-flops, said common control circuit for receiving a reference indicator signal from each of said reference flip-flops and for providing first and second prepositioning signals to said reference flip-flop management circuit wherein the value of the first and second prepositioning signals is determined by the value of the coincidence and reference indicator signals.

13. The device of claim 12 wherein said common control circuit comprises:
an evaluation circuit for providing the evaluation signal and for performing a NOR logic operation upon a set of logical terms, each of said logical terms being representative of a particular extract, and each of said logical terms corresponding to a logical product between a complement of a reference indicator signal and a complement of the coincidence signal corresponding to said extract;
a latching flip-flop, coupled to said evaluation circuit, for receiving the evaluation signal at an input port thereof and for providing at an output port thereof a latched evaluation signal; and
a synchronization circuit coupled to said latching flip-flop for receiving the latched evaluation signal from said latching flip flop and for providing the first and second prepositioning signals at an output port thereof.

14. The device of claim 13 wherein said reference flip-flop management circuit comprises:
a holding flip-flop, for receiving a coincidence signal at an input port thereof and for providing a latched coincidence signal at an output port thereof during the first phase of the two-phase synchronization signal; and
a management circuit, having an input port coupled to the output port of said holding flip-flop and having an output port coupled to a corresponding one of the reference flip-flops, wherein said management circuit receives the first and second prepositioning signals and an external control signal and provides a management circuit control signal to said corresponding reference flip-flop and wherein the management circuit resets the corresponding reference flip-flop to a logical value of 0 when the following conditions are met:
(1) the first prepositioning signal is provided having a logical value of 1; and
(2) the latched coincidence signal is provided having a logic value of 0.

15. The device of claim 14 wherein said evaluation circuit comprises:
an evaluation line wherein said evaluation line is prechargeable during the second phase of said two-phase synchronization signal, wherein said evaluation line is provided having a reference voltage coupled thereto, wherein the reference voltage is provided having a first predetermined value in response to the associative memory being in a saturation state; and
a plurality of serially connected transistor pairs, with a first electrode of a first transistor of each transistor pair coupled to said evaluation line and a first electrode of a second transistor of each transistor pair coupled to a first reference potential and wherein, for each transistor pair, a signal having a value which is a complement of the value of a reference indicator signal is fed to a second electrode of the first transistor of said transistor pair, and a signal having a value which is a complement of the value of a coincidence signal corresponding to said extract is fed to a second electrode of the second transistor of said transistor pair.

16. A method of allowing execution of an associative read and a corresponding updating of an indicator regardless of a logical state of the indicator during a single clock cycle having two clock phase, said method comprising the steps of:
during a first phase of a two-phase clock signal performing the steps of:
(a) comparing a virtual address to be translated with each virtual address included in an associative memory having a plurality of memory locations wherein each of said memory locations are coupled to one of a like plurality of reference flip-flops;
(b) evaluation a saturation condition of the associative memory;
(c) providing an evaluation signal for each of said memory locations, wherein each evaluation signal is provided having a first value selected in response to said evaluating step, and wherein said evaluation signals indicate a saturation state of said associative memory;
(d) storing each evaluation signal in a corresponding one of a like plurality of reference flip-flops as a latched evaluation signal;
(e) detecting the following conditions;
each of the plurality of reference flip-flops except a last reference flip-flop are placed in a first logic state the last reference flip-flop is placed in a second different logic state; and
the last reference flip-flop in the second logic state is about to be placed in the first logic state, wherein an evaluation signal is provided having a value to indicate a saturation state of said associative memory in response to said conditions being concurrently met; and
during a second phase of the two-phase clock signal performing the steps of:
(a) updating a reference indicator in response to a value of a latched coincidence signal and the latched evaluation signal;
(b) performing the following step in response to the conditions in said detecting step being met:
placing the plurality of reference flip-flops in the second logic state; and
placing the last reference flip-flop in the first logic state.

17. The method of claim 16 wherein said comparing step comprises the steps of:
indicating whether a match has occurred between a virtual address of an information item sought and a virtual address of an extract stored in a particular memory location; and
performing a first one of the following steps in response to said indicating step:
accessing information from the associative memory in the case of said indicating step indicating a match occurring between a virtual address of an information item sought and a virtual address of an extract stored in a particular memory location; and
accessing information from the main memory and duplicating the information into an associative memory as the information portion of an extract in response to said indicating step indicating no match occurring between a virtual address of an information item sought and a virtual address of an extract stored in a particular memory location of the associative memory.

* * * * *

UNITED STATES PATENT AND TRADEMARK OFFICE
CERTIFICATE OF CORRECTION

PATENT NO. : 5,295,253
DATED : March 15, 1994
INVENTOR(S) : Laurent Ducousso et al Page 1 of 3

It is certified that error appears in the above-indentified patent and that said Letters Patent is hereby corrected as shown below:

Column 1, line 44, "executed)" should read --executed).-- ending the sentence with a period.

Column 8, line 41, "correspond" should read --corresponds--.

Column 9, line 4, "N5" should read --N6--.

Column 9, line 68, "$BPR_1$, $BPR_2$," should read --BPR1, BPR2,--.

Column 10, line 1, "$BPP_n$, and" should read --$BPR_n$,--.

Column 11, line 14, "$PR_i$" should read --$PR_i$.-- ending the sentence with a period.

Column 13, line 17, "precharged" should read --prechargeable--.

Column 14, line 6, "a" should read --is--.

Column 14, line 14, "response" should read --responsive--.

Column 14, line 36/37, "through an address translation processor" should read --through a processor--.

Column 14, line 37, "the address translation processor" should read -- the processor--.

Column 14, line 48, "address translation processor" should read --processor--.

UNITED STATES PATENT AND TRADEMARK OFFICE
CERTIFICATE OF CORRECTION

PATENT NO. : 5,295,253
DATED : March 151, 1994
INVENTOR(S) : Laurent Ducousso et al It is certified that error appears in the above-indentified patent and that said Letters Patent is hereby corrected as shown below:

Column 14, line 50, "the address translation processor" should read --the processor--.

Column 15, line 54, "the address translation processor" should read --the processor--.

Column 15, line 59/60, "the address translation processor" should read --the processor--.

Column 15, line 63, "the address translation processor" should read --the processor--.

Column 15, line 67/68, "the address translation processor" should read --the processor--.

Column 17, line 34, "phase" should read --phases--.

UNITED STATES PATENT AND TRADEMARK OFFICE
CERTIFICATE OF CORRECTION

PATENT NO. : 5,295,253
DATED : March 15, 1994
INVENTOR(S) : Laurent Ducousso et al It is certified that error appears in the above-indentified patent and that said Letters Patent is hereby corrected as shown below:

Column 17, line 45, "evaluation" should read --evaluating--.

Column 18, line 4, "of a like" should read --of the like--.

Column 18, line 44, "the" should read --an--.

Signed and Sealed this

Twenty-seventh Day of June, 1995

Attest:

BRUCE LEHMAN

Attesting Officer     Commissioner of Patents and Trademarks